US012608274B2

(12) United States Patent
Eyal et al.

(10) Patent No.: US 12,608,274 B2
(45) Date of Patent: *Apr. 21, 2026

(54) LOW LATENCY CROSSTALK MITIGATION IN A NONVOLATILE MEMORY

(71) Applicant: Apple Inc., Cupertino, CA (US)

(72) Inventors: Alon Eyal, Zichron Yaakov (IL); Nir Tishbi, Kfar Saba (IL); Yonathan Tate, Kfar Saba (IL); Michael Tsohar, Givat Shmuel (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,122

(22) Filed: Jul. 22, 2024

(65) Prior Publication Data

US 2025/0278330 A1    Sep. 4, 2025

Related U.S. Application Data

(60) Provisional application No. 63/559,227, filed on Feb. 29, 2024.

(51) Int. Cl.
G06F 11/10          (2006.01)

(52) U.S. Cl.
CPC ...... G06F 11/1016 (2013.01); G06F 11/1004 (2013.01)

(58) Field of Classification Search
CPC .......................... G06F 11/1016; G06F 11/1004
USPC ......................................................... 714/764
See application file for complete search history.

(56) References Cited

U.S. PATENT DOCUMENTS

| | | | |
|---|---|---|---|
| 7,196,946 B2 | 3/2007 | Chen et al. | |
| 7,436,733 B2 | 10/2008 | Mokhlesi | |
| 8,031,526 B1 | 10/2011 | Wu et al. | |
| 8,050,086 B2 | 11/2011 | Shalvi et al. | |
| 8,060,806 B2 | 11/2011 | Shalvi et al. | |
| 8,156,398 B2 | 4/2012 | Sommer | |
| 8,156,403 B2 | 4/2012 | Shalvi et al. | |
| 8,209,588 B2 | 6/2012 | Perlmutter et al. | |

(Continued)

OTHER PUBLICATIONS

Aylon et al., U.S. Appl. No. 18/422,007, filed Jan. 25, 2024.
Non Final Office Action, U.S. Appl. No. 18/422,007, dated Apr. 10, 2025.

*Primary Examiner* — Esaw T Abraham
*Assistant Examiner* — Enam Ahmed
(74) *Attorney, Agent, or Firm* — Meitar Patents Ltd.; Daniel Kligler

(57)          ABSTRACT

A storage system includes circuitry and memory cells that are coupled to multiple WLs and to multiple BLs. The circuitry includes combinational logic, and is configured to: set a read voltage to a target WL, and set each of the other WLs, including a neighbor WL neighboring to the target WL, to a predefined full conducting voltage or to a predefined partial conducting voltage lower than the full conducting voltage, pre-charge the BLs, and while discharging the BLs, read a page from a group of target memory cells multiple times, to produce multiple respective binary readouts, at least one of the readouts corresponds to setting the neighbor WL to the partial conducting voltage, apply the combinational logic to the readouts to produce (i) output bits of the page, and (ii) confidence levels associated with the output bits, and transmit the output bits and the confidence levels to a controller.

18 Claims, 5 Drawing Sheets

(56) References Cited

U.S. PATENT DOCUMENTS

| | | | |
|---|---|---|---|
| 8,230,300 B2 | 7/2012 | Perlmutter et al. | |
| 8,374,026 B2 | 2/2013 | Sharon et al. | |
| 8,508,989 B2 | 8/2013 | Alrod et al. | |
| 8,650,352 B2 | 2/2014 | Weingarten | |
| 8,743,615 B2 | 6/2014 | Lee et al. | |
| 8,873,288 B2 | 10/2014 | Sharon et al. | |
| 9,086,993 B2 | 7/2015 | Sokolov et al. | |
| 9,229,804 B2 | 1/2016 | Birk et al. | |
| 10,210,941 B1 | 2/2019 | Chen et al. | |
| 10,726,891 B1 | 7/2020 | Prakash et al. | |
| 10,854,304 B1 | 12/2020 | Xu et al. | |
| 10,884,855 B1 | 1/2021 | Yazovitsky et al. | |
| 11,513,887 B1 | 11/2022 | Tishbi | |
| 11,768,732 B2* | 9/2023 | Kumano | G06F 11/1048 714/764 |
| 11,990,190 B2 | 5/2024 | Maejima | |
| 12,050,514 B1 | 7/2024 | Steiner et al. | |
| 2009/0228761 A1 | 9/2009 | Perlmutter et al. | |
| 2012/0151299 A1* | 6/2012 | Suh | G11C 11/40615 714/E11.002 |
| 2013/0007559 A1 | 1/2013 | Motwani | |
| 2014/0201596 A1* | 7/2014 | Baum | H03M 13/1128 714/764 |
| 2014/0331106 A1 | 11/2014 | Baum et al. | |
| 2014/0344519 A1 | 11/2014 | Gurgi et al. | |
| 2016/0092301 A1* | 3/2016 | Ish-Shalom | H03M 13/45 714/764 |
| 2016/0203047 A1* | 7/2016 | No | G06F 3/0679 714/764 |
| 2020/0026470 A1* | 1/2020 | Yang | G11C 11/5628 |
| 2023/0395161 A1 | 12/2023 | Kaynak et al. | |
| 2024/0313806 A1 | 9/2024 | Steiner et al. | |

* cited by examiner

STANDARD READ WITH
NEIGHBOR WL SET TO FULL
CONDUCTING VOLTAGE

MODIFIED READ WITH
NEIGHBOR WL SET TO PARTIAL
CONDUCTING VOLTAGE

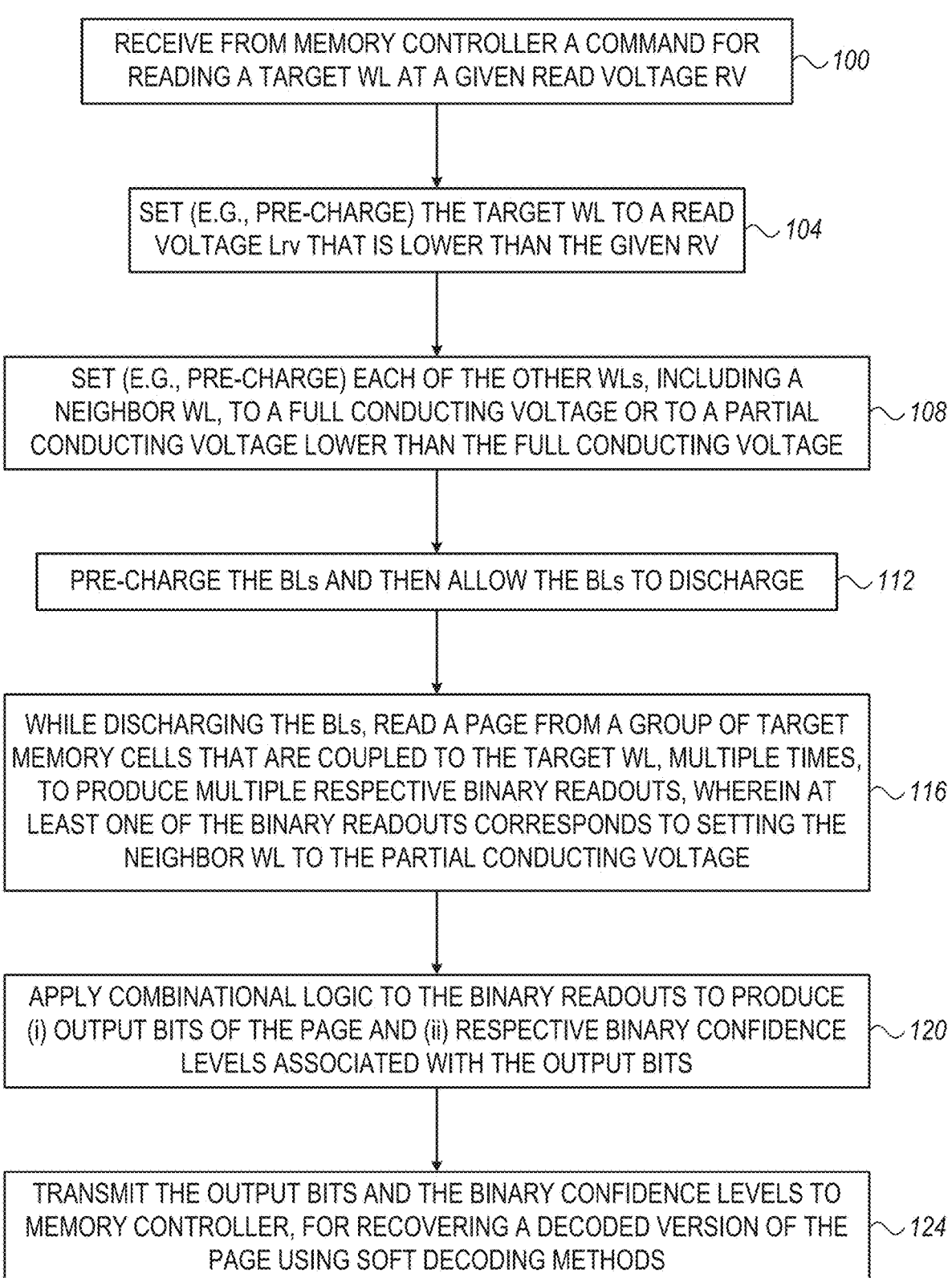

RECEIVE FROM MEMORY CONTROLLER A COMMAND FOR READING A TARGET WL AT A GIVEN READ VOLTAGE RV ~100

SET (E.G., PRE-CHARGE) THE TARGET WL TO A READ VOLTAGE Lrv THAT IS LOWER THAN THE GIVEN RV ~104

SET (E.G., PRE-CHARGE) EACH OF THE OTHER WLs, INCLUDING A NEIGHBOR WL, TO A FULL CONDUCTING VOLTAGE OR TO A PARTIAL CONDUCTING VOLTAGE LOWER THAN THE FULL CONDUCTING VOLTAGE ~108

PRE-CHARGE THE BLs AND THEN ALLOW THE BLs TO DISCHARGE ~112

WHILE DISCHARGING THE BLs, READ A PAGE FROM A GROUP OF TARGET MEMORY CELLS THAT ARE COUPLED TO THE TARGET WL, MULTIPLE TIMES, TO PRODUCE MULTIPLE RESPECTIVE BINARY READOUTS, WHEREIN AT LEAST ONE OF THE BINARY READOUTS CORRESPONDS TO SETTING THE NEIGHBOR WL TO THE PARTIAL CONDUCTING VOLTAGE ~116

APPLY COMBINATIONAL LOGIC TO THE BINARY READOUTS TO PRODUCE (i) OUTPUT BITS OF THE PAGE AND (ii) RESPECTIVE BINARY CONFIDENCE LEVELS ASSOCIATED WITH THE OUTPUT BITS ~120

TRANSMIT THE OUTPUT BITS AND THE BINARY CONFIDENCE LEVELS TO MEMORY CONTROLLER, FOR RECOVERING A DECODED VERSION OF THE PAGE USING SOFT DECODING METHODS ~124

*FIG. 4*

READ OPERATION — 100

BLs DISCHARGE — 104

| | INTERVAL_1 (110A) | INTERVAL_2 (110B) | INTERVAL_3 (110C) | INTERVAL_4 (110D) |
|---|---|---|---|---|
| PRE-CHARGE (102) | | | | |
| NEIGHBOR WL VOLTAGE (130) | VREAD/2 | VREAD/2 | VREAD | VREAD |
| TARGET WL READ VOLTAGE (132) | Lrv | EMULATED Rrv | Lrv | EMULATED Rrv |
| CONDITION FOR BL DISCHARGE (134) | Vt<Lrv & Vt_N < VREAD/2 | Vt<Rrv & Vt_N < VREAD/2 | Vt<Lrv & Vt_N > VREAD/2 | Vt<Rrv & Vt_N > VREAD/2 |
| READOUT (136) | L_LOW | R_LOW | L_HIGH | R_HIGH |
| CALC Hb (138) | Hb=L_LOW | Hb+=R_LOW | SKIP | Hb+=R_HIGH |
| CALC Sb (140) | SKIP | Sb=Hb+L_HIGH | Sb=Hb+L_HIGH | Sb+=R_HIGH |

*FIG. 5*

LOW LATENCY CROSSTALK MITIGATION IN A NONVOLATILE MEMORY

CROSS-REFERENCE TO RELATED APPLICATIONS

This application claims the benefit of U.S. Provisional Patent Application 63/559,227, filed Feb. 29, 2024, whose disclosure is incorporated herein by reference.

TECHNICAL FIELD

Embodiments described herein relate generally to data storage, and particularly to methods and systems for low latency read operations with crosstalk mitigation in a non-volatile memory.

BACKGROUND

A nonvolatile memory may be subjected to various impairments that may cause errors in data read from the memory. For example, crosstalk may cause errors when storage values of target memory cells are affected by memory cells neighboring to the target memory cells.

Methods for mitigating crosstalk among memory cells are known in the art. For example, U.S. Pat. No. 10,884,855 describes a storage device including circuitry and memory cells that store data in Np programming levels of threshold voltage values. The circuitry defines NRv threshold-sets, each includes Ns read thresholds that define Ns+1 zones, produces Ns readouts by reading, from a target WL, using the Ns read thresholds, a target page that was stored encoded using an Error Correction Code (ECC), and produces a reference readout by reading the target page using optimal read thresholds. The circuitry identifies Np programming levels of memory cells in a neighbor WL for classifying target cells in the target WL into Np NRv cell-groups. The circuitry calculates, per zone, Np LLR values, for the respective Np programming levels, based on the reference readout, the Ns readouts and the classification, assigns the LLR values to the target cells, and recovers the target page by applying to the assigned LLR values soft decoding for decoding the ECC.

SUMMARY

An embodiment that is described herein provides a storage system that includes circuitry and a plurality of memory cells. The memory cells are coupled to multiple WLs and to multiple BLs. The circuitry includes combinational logic implemented in hardware, and is configured to: set a first read voltage to a target WL among the multiple WLs, and set each of the WLs other than the target WL, including a neighbor WL neighboring to the target WL, to a predefined full conducting voltage or to a predefined partial conducting voltage lower than the full conducting voltage, pre-charge the multiple BLs, and while discharging the pre-charged BLs, read a page from a group of target memory cells that are coupled to the target WL, multiple times, to produce multiple respective binary readouts, at least one of the binary readouts corresponds to setting the neighbor WL to the partial conducting voltage, apply the combinational logic to the binary readouts to produce (i) output bits of the page, and (ii) respective binary confidence levels associated with the output bits, and transmit the output bits and the binary confidence levels to a controller.

In some embodiments, the circuitry is configured to read the target WL multiple times at respective predetermined delays relative to a time of the pre-charge, to produce the multiple readouts. In other embodiments, the circuitry is configured to pre-charge the BLs again only in performing a subsequent read operation from the memory cells. In yet other embodiments, the circuitry is configured to read the target WL in a sequence of time intervals.

In an embodiment, for reading the target WL in a first time interval and in a second time interval among the time intervals, the circuitry is configured to set the neighbor WL to the partial conducting voltage. In another embodiment, for reading the target WL in a third time interval and in a fourth time interval that follow the first and the second time intervals, the circuitry is configured to set the neighbor WL to the full conducting voltage. In yet another embodiment, during the second and the fourth time intervals, the circuitry is configured to read the target WL while emulating the reading of the target WL at a second read voltage higher than the first read voltage.

In some embodiments, the circuitry resides in a memory device that includes the memory cells. In other embodiments, the page was stored encoded using an error correction code, and the circuitry is configured to transmit the output bits and the confidence levels to the controller for recovering a decoded version of the page by applying by the controller soft decoding to both the output bits and the confidence levels.

There is additionally provided, in accordance with an embodiment that is described herein, a method for data storage, including: in a storage system that includes circuitry and a plurality of memory cells coupled to multiple WLs and to multiple BLs, setting, by the circuitry, a first read voltage to a target WL among the multiple WLs, and setting each of the WLs other than the target WL, including a neighbor WL neighboring to the target WL, to a predefined full conducting voltage or to a predefined partial conducting voltage lower than the full conducting voltage. The multiple BLs are pre-charged. While discharging the pre-charged BLs, a page is read from a group of target memory cells that are coupled to the target WL, multiple times, to produce multiple respective binary readouts, at least one of the binary readouts corresponds to setting the neighbor WL to the partial conducting voltage. Combinational logic of the circuitry, implemented in hardware, is applied to the binary readouts to produce (i) output bits of the page, and (ii) respective binary confidence levels associated with the output bits. The output bits and the binary confidence levels are transmitted to a controller.

These and other embodiments will be more fully understood from the following detailed description of the embodiments thereof, taken together with the drawings in which:

BRIEF DESCRIPTION OF THE DRAWINGS

FIG. 4 is a flow chart that schematically illustrates a low latency reading scheme that mitigates crosstalk interference, in accordance with an embodiment that is described herein; and FIG. 5 is a diagram that schematically illustrates steps in performing a read operation using the method of FIG. 4, in accordance with an embodiment that is described herein.

DETAILED DESCRIPTION OF EMBODIMENTS

Overview

Figure 1:
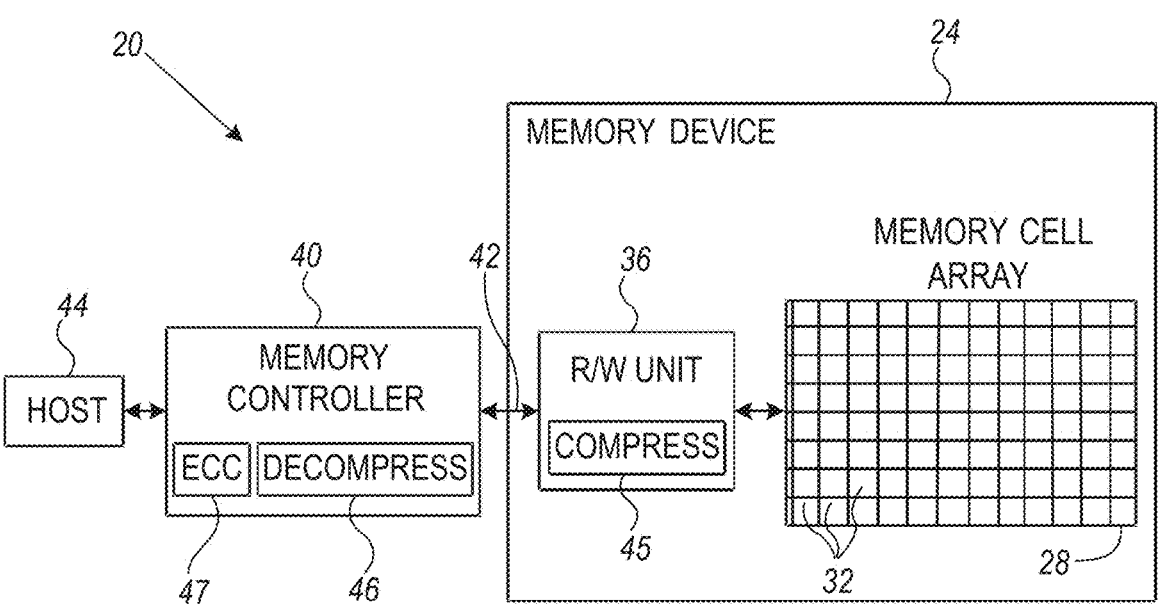
FIG. 1 is a block diagram that schematically illustrates a memory system, in accordance with an embodiment that is described herein.

Embodiments that are described herein provide methods, systems, and circuits for low latency read operations with crosstalk mitigation in nonvolatile memory devices.

A memory device typically comprises an array of memory cells arranged in Word Lines (WLs) containing groups of memory cells that can be read concurrently. Each memory cell in the array can be programmed to one of multiple predefined programming levels. In a memory device whose memory cells store multiple bits per cell, each programming level represents a dedicated combination of multi-bit values. Memory cells are typically read from a WL in units of a data page (also simply referred to as "page", for brevity).

The threshold voltages, (e.g., storage values) of memory cells programed to a given programming level are typically distributed about that programming level. Due to these threshold voltage distributions and to various impairments, the data read from a group of memory cells may contain errors. To increase storage reliability, data is typically stored in the memory device encoded using a suitable error correction code (ECC), and upon reading, decoded using the ECC to correct errors, if any.

The threshold voltages of target memory cells may be affected by the threshold voltages of adjacent memory cells, which may result in errors. Such phenomenon is also referred to as "crosstalk". The number of errors caused by crosstalk may depend on the geometry and density of the memory array, and on the threshold voltages to which the neighbor memory cells are programmed.

Target memory cells in a target WL are primarily affected by neighbor memory cells in the nearest WL that was programmed after the target WL. Crosstalk may be also caused by neighbor memory cells that were programmed before the target memory cells in the target WL. A neighbor memory cell having a high threshold voltage typically causes significant increase to the threshold voltage of the victim target cell, whereas a neighbor memory cell having a low threshold voltage typically causes smaller increase to the threshold voltage of the victim target cell. High and low threshold voltages of neighbor memory cells may be specified above and below respective high and low read thresholds, or above and below a certain single read threshold.

In a typical storage system, a memory controller is coupled to a memory device via a suitable link. The memory controller stores data in the memory device and retrieves the data from the memory device on demand. In some modes of operation, the memory controller reads data from a large number of WLs sequentially, e.g., in reading a file stored in the memory. In such cases it is important to perform fast read operations to maximize the reading throughput, with minimal or no reduction in reliability.

In principle, crosstalk interference could be mitigated by first estimating the level of crosstalk caused by neighbor memory cells to the target memory cells being read, and then compensating for that crosstalk, accordingly. Such methods, however, are typically highly complex and require long processing time, which may limit the achievable reading throughput.

In one reading scheme, also referred to herein as a "soft sense" scheme, within a single read operation, the target WL is read using read voltages denoted "Lrv" and "Rrv" (wherein Lrv<Rrv), to produce respective readouts denoted "Lr" and "Rr". In the soft sense scheme, Lrv and Rrv serve for producing hard decision bits denoted "Hb", and soft bits denoted "Sb" specifying respective confidence levels of the hard decision bits. For example, in the soft sense scheme, the hard bits may be given by Hb=Lrv and the soft bits may be calculated as given by Sb=XOR (Lr, Rr), wherein the symbol "XOR" denotes a bitwise logical XOR operation. By decoding the underlying ECC using both the hard bits Hb and the soft bits Sb, the decoding capabilities improve compared to using a single readout scheme. Extended soft sense schemes resulting in low latency read operations, and that additionally mitigate crosstalk, will be described in detail below.

In performing a read operation, WLs and BLs are typically pre-charged, and then the BLs are allowed to discharge for a predefined sensing interval, after which the voltages of the BLs are monitored and compared to a predefined discharge threshold. The binary outcomes of the comparison are latched to produce a corresponding binary readout. A single operation that includes both the comparison and latching operations is also collectively referred to herein as a "strobe operation". When the threshold voltage of a memory cell is lower than the read voltage to which the target WL is set, the BL may discharge at a relatively high rate during the sensing interval. When the cell's threshold voltage is higher than the read voltage, the BL typically remains charged, or dischargers at a much lower rate than memory cells below the read voltage. If the BL discharges below the discharge threshold, a binary value '1' is latched. Otherwise, the BL does not discharge below the discharge threshold and a binary level '0' is latched. In alternative embodiments, the roles of '0' and '1' may be switched.

In some embodiments, after strobing the BLs, the BLs continue discharging for another sensing interval (or multiple sensing intervals) and additional strobe operations are applied. Consequently, additional BLs may have now been discharged below the discharge threshold. This means that the subsequent strobe effectively corresponds to sampling the target WL at a read voltage higher than Lrv, without applying another pre-charge operation. In an embodiment, the duration between the first strobe operation and a subsequent strobe operation is designed for sampling the target WL at the read voltage Rrv of the soft sense scheme. Since the target WL is explicitly set to Lrv, but not to Rrv, the read voltage Rrv in this case is also referred to herein as an "emulated Rrv".

In some embodiments, the two-interval sensing method with emulated Rrv as described above may be used in combination with the soft sense method, to effectively produce two readouts Lr and Rr, corresponding to the read voltages Lrv and (emulated) Rrv, using a single pre-charge operation.

In the disclosed embodiments, to mitigate crosstalk interference caused to the target memory cells by neighbor memory cells, the target WL is read at the read voltages Lrv and Rrv (or emulated Rrv) while taking into consideration the threshold voltages of the neighbor memory cells, but without explicitly reading the neighbor WL. To this end, the target WL is read multiple times over multiple respective sensing intervals, while the neighbor WL is set to a full conducting voltage in one or more of the sensing intervals and to a partial conducting voltage in other one or more of the sensing intervals.

Consider a storage system that includes circuitry and a plurality of memory cells. The memory cells are coupled to multiple WLs and to multiple BLs. The circuitry includes combinational logic implemented in hardware, and is configured to set a first read voltage to a target WL among the multiple WLs, and set each of the WLs other than the target WL, including a neighbor WL neighboring to the target WL, to a predefined full conducting voltage or to a predefined partial conducting voltage lower than the full conducting voltage. The circuitry further pre-charges the multiple BLs, and while discharging the pre-charged BLs reads a page from a group of target memory cells that are coupled to the target WL, multiple times, to produce multiple respective binary readouts, wherein at least one of the binary readouts corresponds to setting the neighbor WL to the partial conducting voltage. The circuitry applies the combinational logic to the binary readouts to produce (i) output bits of the page, and (ii) respective binary confidence levels associated with the output bits, and transmits the output bits and the binary confidence levels to a controller, for soft decoding.

In some embodiments, in performing the read operation, the circuitry reads the target WL multiple times at respective predetermined delays relative to a time of the pre-charge, to produce the multiple readouts. In an embodiment, the circuitry pre-charges the BLs again only in performing a subsequent read operation from the memory cells.

To read the target WL multiple times, the circuitry reads the target WL in a sequence of time intervals, and sets the target WL and neighbor WL to specified read voltages and conducting voltages. In one embodiment, for reading the target WL in the first and the second time intervals among the time intervals, the circuitry sets the neighbor WL to the partial conducting voltage. In another embodiment, for reading the target WL in third and fourth time intervals that follow the first and second time intervals, the circuitry sets the neighbor WL to the full conducting voltage. In yet another embodiment, during the second and the fourth time intervals, the circuitry reads the target WL while emulating the reading of the target WL at a second read voltage higher than the first read voltage.

In some storage systems, the circuitry resides in a memory device comprising the memory cells.

In typical storage systems the page to be read was cells encoded using an error stored in the memory correction code. In such embodiments, the circuitry transmits the output bits and the confidence levels to the controller for recovering a decoded version of the page by applying by the controller soft decoding to both the output bits and the confidence levels.

In the disclosed techniques, in executing a read command, the target WL is read in a sequence of multiple time intervals, following a single pre-charge operation, to produce multiple respective readouts. The multiple readouts are processed by combinational logic to produce hard bits and respective confidence levels. In each of the time intervals, the target WL is set to a read voltage Lrv or Rrv (e.g., emulated RV), and the neighbor WL neighboring to the target WL is set to a full conducting voltage or to a partial conducting voltage, thereby enabling crosstalk mitigation by discriminating between hard bits of target memory cells whose neighbor cells have low and high threshold voltages, which results in improved decoding capabilities. Since only a single pre-charge operation is required for executing the read command, the latency of the read command is significantly lower than conventional read operations that apply multiple pre-charge operations per read operation.

System Description

FIG. 1 is a block diagram that schematically illustrates a memory system 20, in accordance with an embodiment that is described herein. Memory system 20 can be used in various host systems and devices, such as in computing devices, cellular phones or other communication terminals, removable memory modules ("disk-on-key" devices), Solid State Disks (SSD), digital cameras, music and other media players and/or any other system or device in which data is stored and retrieved.

Memory system 20 includes a memory device 24 that stores data in a memory cell array 28. The memory cell array includes multiple memory cells 32. The term "memory cell" is typically used to describe any memory cell that holds a continuous, analog level of a physical quantity, such as an electrical voltage or charge. Memory cell array 28 may include memory cells of any kind, such as, for example, NAND, NOR and CTF Flash cells, PCM, NROM, FRAM, MRAM and DRAM cells. Memory cells 32 may include Single-Level Cells (SLC) or Multi-Level Cells (MLC, also referred to as multi-bit cells). Alternatively, memory cells that store a higher number of bits per cell, such as Triple-Level Cells (TLC) and Quad-Level Cells (QLC) can also be used.

The charge levels stored in the memory cells and/or the analog voltages or currents written into and read out of the cells are referred to herein collectively as analog values or storage values. Although the embodiments described herein mainly address threshold voltages, the methods and systems described herein may be used with any other suitable kind of storage values.

Memory system 20 stores data in memory cells 32 by programming the memory cells to assume respective programming states, which are also referred to as "programming levels". The programming states are selected from a finite set of possible states, and each state corresponds to a certain nominal storage value. For example, a 2 bit/cell MLC can be programmed to assume one of four possible programming states by writing one of four possible nominal storage values to the memory cell. Alternatively, memory cells that store a higher number of bits per cell such as TLC memory cells that store three bits per cell and QLC memory cells that store four bits per cell can also be used.

Memory device 24 includes a reading/writing (R/W) unit 36, which converts data for storage in the memory device to storage values and writes them into memory cells 32. In alternative embodiments, the R/W unit does not perform the conversion, but is provided with voltage samples, i.e., with the storage values for storage in the cells. When reading data out of memory cell array 28, R/W unit 36 converts the storage values of memory cells 32 into digital samples having a resolution of one or more bits. The R/W unit typically reads data from memory cells 32 by comparing the storage values of the cells to one or more read thresholds (also referred to as "read voltages". Data is typically written to and read from the memory cells in groups that are referred to as pages. In some embodiments, the R/W unit can erase a group of cells 32 by applying one or more negative erasure pulses to the memory cells.

The storage and retrieval of data in and out of memory device 24 is performed by a memory controller 40, which communicates with device 24 over a suitable interface 42. In some embodiments, memory controller 40 produces the storage values for storing in the memory cells and provides these values to R/W unit 36. Alternatively, memory controller 40 may provide the data for storage, and the conversion to storage values is carried out by the R/W unit internally to the memory device.

Memory controller 40 communicates with a host 44, for accepting data for storage in the memory device and for outputting data retrieved from the memory device. In some embodiments, some or even all of the functions of memory controller 40 may be implemented in hardware. Alternatively, memory controller 40 may include a microprocessor that runs suitable software, or a combination of hardware and software elements.

In some embodiments, R/W unit 36 includes a data compression module 45, which compresses some of the information that is to be sent from the memory device to memory controller 40. The memory controller includes a decompression module 46, which decompresses the compressed information received from memory device 24. In particular, R/W unit 36 may produce confidence levels of the storage values read from memory cells 32, and data compression module 45 may compress these confidence levels and send the compressed confidence levels to memory controller 40. (In some embodiments, data compression module 45 can also be used for compressing other types of information, such as stored data that is retrieved from memory cells 32.)

In some embodiments, in performing a read operation with crosstalk mitigation, the memory device reads the target WL multiple times to produce multiple respective local readouts. Each of the readouts corresponds to sensing the target WL at a read voltage Lrv or Rrv (e.g., of the soft sense scheme), and to setting the neighbor WL to a full conducting voltage or to a partial conducting voltage. Based on the multiple readouts, the memory device determines hard storage values and associated confidence levels to be transferred to the memory controller for applying soft decoding to recover the page being read based on both the hard storage values and confidence levels.

The memory controller uses the storage values read from memory cells 32, and the associated confidence levels, to reconstruct the stored data. For example, memory controller 40 may include an error correction code (ECC) unit 47, which encodes the data for storage using a suitable ECC, and decodes the ECC of the data retrieved from memory cells 32. ECC unit 47 may apply any suitable type of ECC, such as, for example, a Low-Density Parity Check (LDPC) code or a Bose-Chaudhuri-Hocquenghem (BCH) code. In some embodiments, ECC unit 47 uses the confidence levels to improve the ECC decoding performance. Several example methods for obtaining and compressing confidence levels, as well as for using the confidence levels in ECC decoding, are described, for example, in a U.S. Pat. No. 8,230,300, whose disclosure is incorporated herein by reference. (In the event of any inconsistencies between any incorporated document and this document, it is intended that this document control.)

Figure 1A:
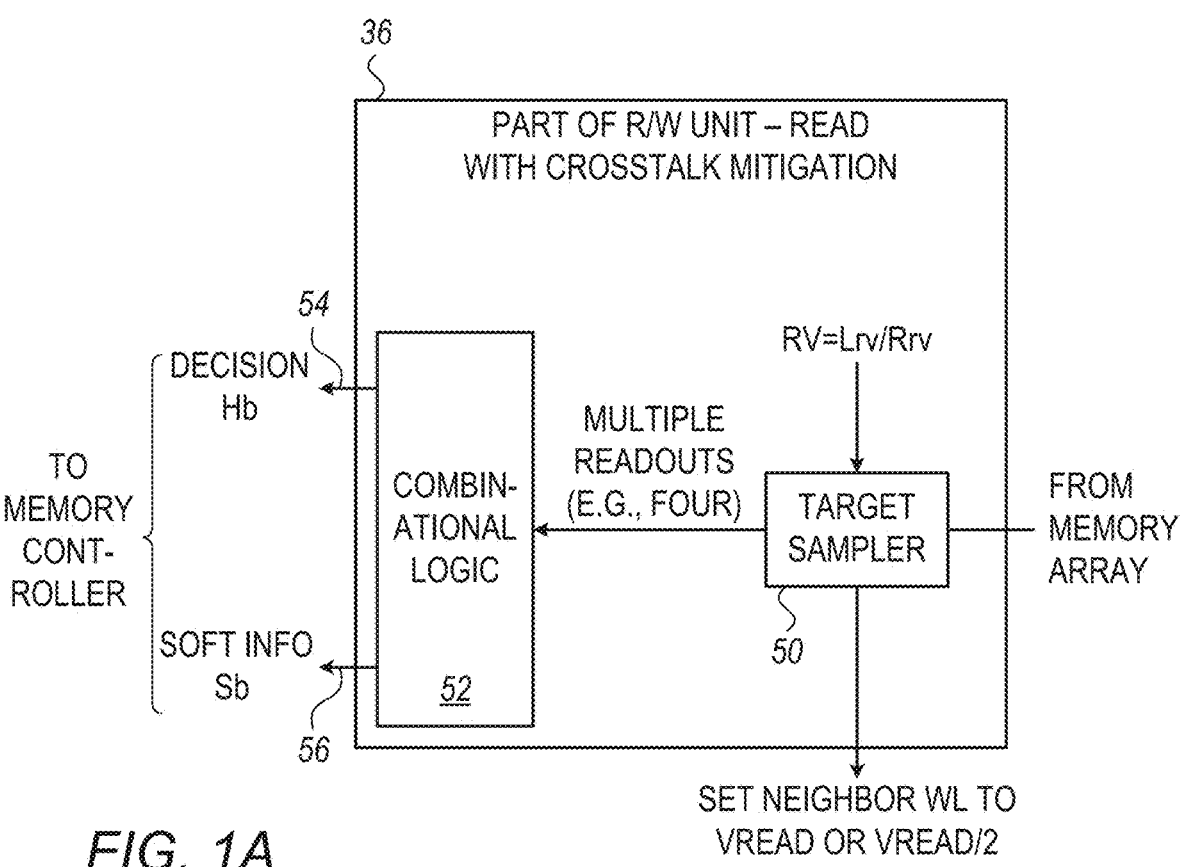
FIG. 1A is a block diagram that schematically illustrates part of a R/W unit performing a low latency read operation with crosstalk mitigation, in accordance with an embodiment that is described herein.

FIG. 1A is a block diagram that schematically illustrates part of R/W unit 36 performing a low latency read operation with crosstalk mitigation, in accordance with an embodiment that is described herein.

The description of FIG. 1A refers to elements of the R/W unit that are related to reading data from a target WL while mitigating crosstalk caused by memory cells of a neighbor WL. In FIG. 1A, the R/W unit comprises a target sampler 50 and combinational logic 52. The target sampler reads a group of memory cells (e.g., a page) from the target WL in memory array 28.

More specifically, after pre-charging the BLs, the target sampler reads the page from the target WL multiple times using one or more prespecified read voltages, (or groups of read voltages) to produce multiple target readouts. The target redouts are read without pre-charging the BLs again within the read operation, as will be described below, which results in a low latency read operation.

In the present example the target sampler produces four redouts, wherein two of the four readouts correspond to setting a read voltage Lrv to the target WL, and the other two readouts correspond to setting another read voltage Rrv>Lrv to the target WL. In addition, in the present example, the target sampler sets the neighbor WL to a full conducting voltage (e.g., VREAD) or to a partial conducting voltage (e.g., equal to or close to VREAD/2). Alternatively, other suitable values of the full conducting voltage and/or partial conducting voltage can also be used.

Combinational logic 52 applies to the multiple readouts combinational logic calculation whose output include (i) decision bits 54 (denoted Hb) representing the reconstructed data bits of the page, and (ii) soft information 56 (denoted Sb) specifying confidence levels assigned respectively to the decision bits. The decision bits and confidence levels are provided to memory controller 40 via link 42. In some embodiments the confidence levels are binary confidence levels having two values—a high confidence level and a low confidence level.

The memory system configuration of FIG. 1 (including the R/W part of FIG. 1A) is an example memory system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the example system configuration shown in FIG. 1, memory device 24 and memory controller 40 are implemented as two separate Integrated Circuits (ICs). In alternative embodiments, however, the memory device and memory controller may be integrated on separate semiconductor dies in a single Multi-Chip Package (MCP) or System on Chip (SoC), and may be interconnected by an internal bus. Further alternatively, some or all of the circuitry of the memory controller may reside on the same die on which the memory array is disposed. Further alternatively, some or all of the functionality of memory controller 40 can be implemented in software and carried out by a processor or other element of the host system. In some embodiments, host 44 and memory controller 40 may be fabricated on the same die, or on separate dies in the same device package.

In some implementations, a single memory controller may be connected to multiple memory devices 24. In yet another embodiment, some or all of the memory controller functionality may be carried out by a separate unit, referred to as a memory extension, which acts as a slave of memory device 24. Typically, memory controller 40 includes a general-purpose processor, which is programmed in software to carry out at least some of the functions described herein. The software may be downloaded to the processor in electronic form, over a network, for example, or it may, alternatively or additionally, be provided and/or stored on tangible media, such as magnetic, optical, or electronic memory.

The different elements of R/W unit 36 may be implemented in hardware, such as using one or more Application-Specific Integrated Circuits (ASICs) or Field-Programmable Gate Arrays (FPGAs).

Memory cells 32 of memory cell array 28 are typically arranged in a grid having multiple rows and columns, commonly referred to as word lines and bit lines, respectively. The memory array is typically divided into multiple pages, i.e., groups of memory cells that are programmed and read simultaneously. Memory cells 32 are typically erased in groups of word lines that are referred to as erasure blocks. In some embodiments, a given memory device includes multiple memory cell arrays, which may be fabricated on separate dies.

In the description that follows, and in the claims, the term "circuitry" refers to elements of memory device 24, excluding interface 42 and memory cell array 28, to elements of memory controller implemented in hardware, or both. In the example of FIG. 1, the circuitry includes R/W unit 36, including the R/W unit elements of FIG. 1A (e.g., target sampler 50 and combinational logic 52) and data compression module 45.

Producing Multiple Readouts Following a Single Pre-Charge Operation

In a conventional read operation, R/W unit 36 typically performs several suboperations as follows. First, during a pre-charge interval, the R/W unit (i) charges the selected WL (target WL) to the required read voltage (RV), (ii) charges the unselected WLs to a full conducting voltage (whose value is also referred to herein as "VREAD"), and (iii) charges the BLs to a BL charging voltage. After a predefined settling time, during which the voltages of the charged BLs and WLs settle, the R/W unit opens the drain gate selector (DGS) transistor and the source gate selector (SGS) transistor to allow the BLs to discharge. After discharging for a predefined discharge period, (also referred to as a "sensing time" or "sensing interval"), the voltages of the BLs are monitored and strobed to produce binary values that are latched to produce a corresponding readout.

When the threshold voltage of a given a memory cell coupled to the selected WL and to a given BL, is lower than the read voltage of the target WL, the given BL typically discharges well below the initial BL charging voltage. On the other hand, when the threshold voltage of the given memory cell is higher than the read voltage, the BL voltage remains close to the initial BL charging voltage, or discharges at a low rate. When the sensing interval terminates, the R/W unit strobes the BL voltage and latches a corresponding binary readout. In the present example, when the BL voltage is below the discharge threshold, the storage value of the memory cell is read as binary '1'. Otherwise, the BL voltage is above the discharge threshold, and the given memory cell is read as binary '0'.

In some reading schemes, multiple readouts are sampled from the same target WL. In such schemes, the R/W unit is typically required to charge the BLs and WLs multiple times over separate respective pre-charging periods. This scheme is inefficient and highly time consuming, because the pre-charging time plus the settling time typically takes a considerable amount (e.g., about ⅓) of the overall read operation duration.

In some embodiments, a reading scheme requires sampling the target WL at two read voltages denoted Lrv and Rrv>Lrv. In this reading scheme, the target WL is set to Lrv, and the BLs are strobed after discharging for a first sensing interval. The resulting readout Lr corresponds to reading the WL at a read voltage Lrv. Then, the BLs continue to discharge for a second sensing interval, after which the BLs are strobed again, resulting in a second readout Rr, which emulates reading the target WL at the read voltage Rrv.

Let Vt denote the threshold voltage of a target memory cell in the target WL. It is noted that the cell discharge response is not a sharp step function of the read voltage but rather a continuous function. This means that during the first sensing interval, memory cells for which Vt>Lrv also allow BL discharging, but at a much slower rate than the target memory cells for which Vt<Lrv.

Typically, memory cells for which Vt is closer to Lrv allow faster discharge rates. Moreover, it is assumed that the function that maps between the discharge rate and the voltage difference (Vt–Lrv) is known in advance. Therefore, during the second interval, it is expected that BLs coupled to target memory cells having threshold voltages up to a certain Vt>Lrv will discharge as well (at a slow rate). Based on the relationship between the discharge rate and voltage difference (Vt–Lrv), the duration of the second interval can be designed such that all BLs coupled to target memory cells up to a certain desired Vt>Lrv (e.g., Rrv) will discharge below the discharge threshold, and therefore read as binary '1', even though the read voltage had been set to Lrv.

In some embodiments, the reading scheme based on a single pre-charge operation with two strobe operations, as described above, may be combined with the soft sense scheme described above, in which the R/W unit produces hard decision bits (Hb) and respective confidence bits (Sb). In such embodiments, the R/W unit samples the memory cells of the target WL, at read voltages Lrv and Rrv (or emulated Rrv) to produce respective readouts Lr and Rr. In accordance with this combined scheme, the R/W unit transfers to the memory controller the hard decision sample Hb=Lr and the soft information given by Sb=XOR (Lr, Rr).

Standard and Modified Read Configurations for Crosstalk Mitigation

Figure 2A:
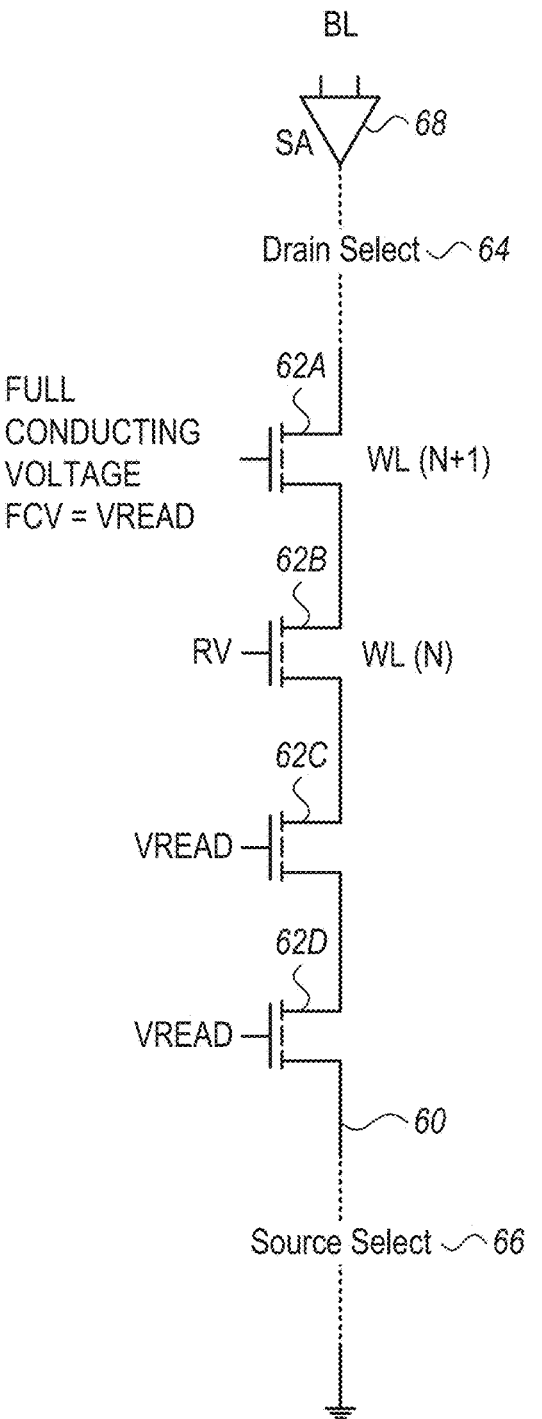
FIGS. 2A and 2B e diagrams that schematically illustrate standard and modified read configurations, in accordance with embodiments that are described herein.
Figure 2B:
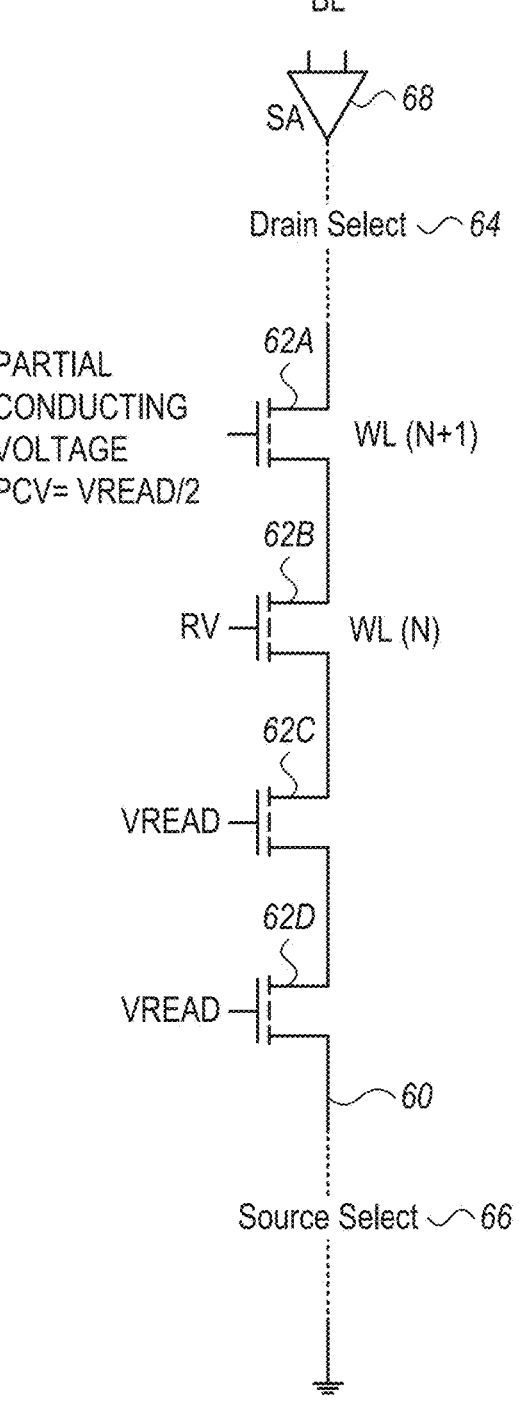

FIGS. 2A and 2B are diagrams that schematically illustrate standard and modified read configurations, in accordance with embodiments that are described herein.

Each of FIGS. 2A and 2B depicts a BL 60 coupled to memory cells 62A . . . 62D, each of which belonging to a different WL. Although in the present example FIGS. 2A and 2B depict only four memory cells (belonging to four respective WL), in practical implementations any suitable numbers of memory cells per column (e.g., 128 memory cells) can also be used. A drain gate selector transistor 64 at the column top and a source gate selector transistor 66 at the column bottom are deactivated during pre-charge periods and activated for allowing BLs discharge. A sense amplifier 68 per BL detects whether the entire column is in a conductive state, or not.

In the present example, memory cell 62B belongs to a target WL denoted WL (N), whereas memory cell 62A belongs to a neighbor WL neighboring to the target WL, denoted WL (N+1). In some embodiments, the neighbor WL is programmed after the target WL, which may affect the storage values read from the target WL.

As will be described below, depending on the read configuration employed at a given time, the neighbor WL may be set to a full conducting voltage (denoted "FCV") or to a partial conducting voltage (denoted "PCV") lower than the full conducting voltage.

FIG. 2A refers to a standard read configuration for reading the target WL at a read voltage RV. In this case, the R/W unit sets the target WL to the desired read voltage (RV) and sets all other WLs to the full conducting voltage, for ensuring that the memory cells in WLs other than the target WLs are in conductive states. The value of the full conducting voltage is also referred to herein as "VREAD". In particular, in the standard read configuration, the neighbor WL is also set to the full conducting voltage. When the threshold voltage (Vt) of the target memory cell 62B is lower than RV, memory cell 62B is in the conductive state, which causes BL discharge during the underlying sensing interval. Otherwise, the target memory cell is in a nonconductive state, and the BL remains charged (or discharges at a low rate).

FIG. 2B refers to a modified read operation applied to the target WL. In this case, the R/W unit sets the neighbor word line WL (N+1) to the partial conducting voltage. In an example embodiment, the partial conducting voltage may be configured to half (or close to half) the value of the full conducting voltage. Alternatively other values of the partial conducting voltage can also be used. In the example of FIG. 2B, the neighbor WL is set to a partial conducting voltage whose value equals VREAD/2.

In the configuration of FIG. 2B, two conditions are required to be met for allowing BL discharge, namely (i) the Vt of the target memory cell (62B) is lower than RV, and (ii) the Vt of the neighbor memory cell (62A) is lower than the partial conducting voltage (VREAD/2). This configuration allows discharge of only BLs for which the neighbor memory cells have low threshold voltages (e.g., below the partial conducting voltage). As noted above, during sensing time, target memory cells for which Vt>Rv may discharge at a low rate and therefore typically cannot reach below the discharging threshold at the sensing interval termination.

As will be described below, the standard and modified read configurations of FIGS. 2A and 2B can be used for discriminating between target memory cells whose neighbor memory cells have high threshold voltages (above the partial conducting voltage) and target memory cells whose neighbor memory cells have low threshold voltages (below the partial conducting voltage), thereby improving discrimination between '0' and '1' hard decision bits having low confidence levels.

Figure 3:
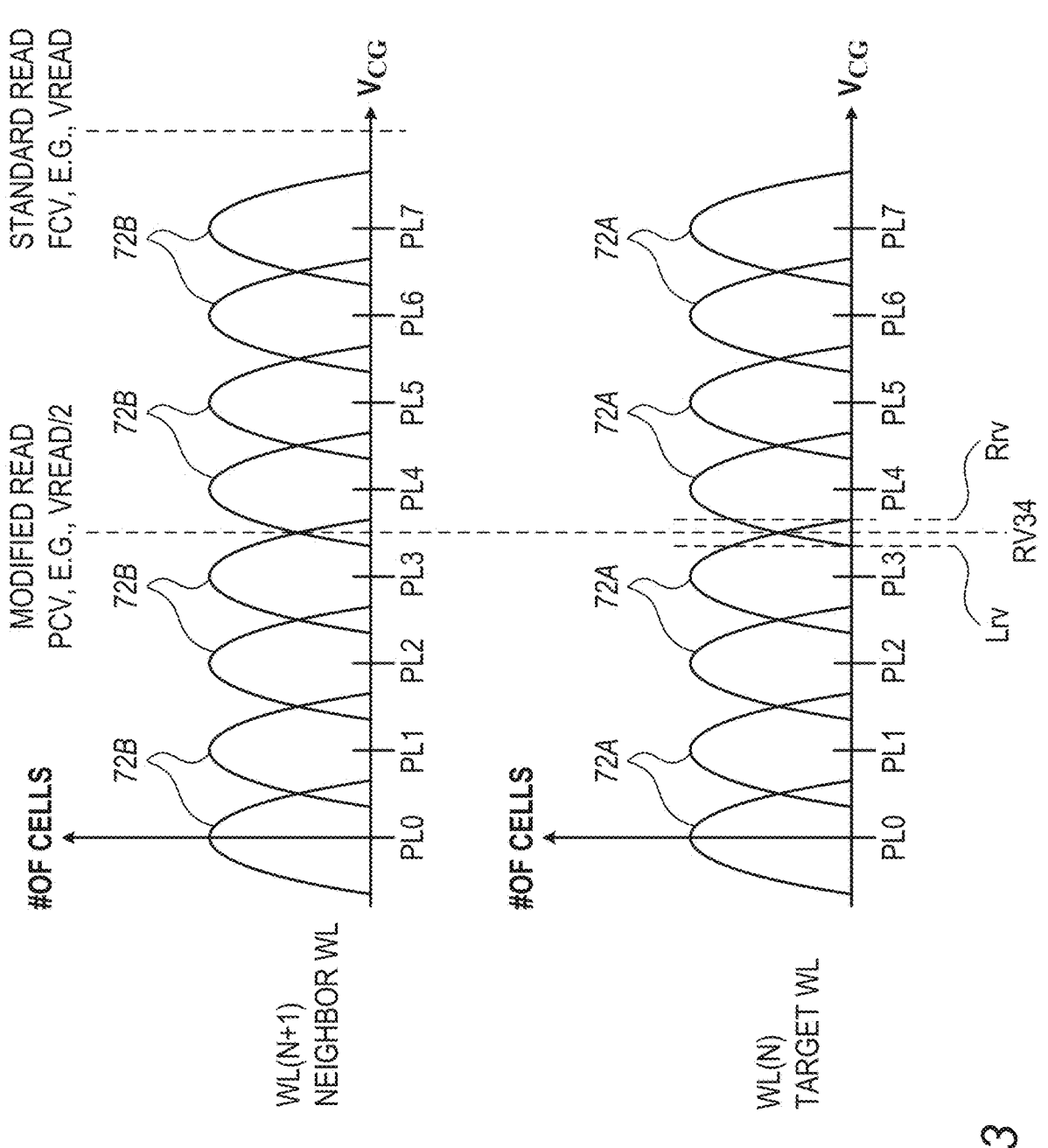
FIG. 3 is a diagram that schematically illustrates threshold voltage distributions (TVDs) of target memory cells and neighbor memory cells, as well as read configurations for crosstalk mitigation, in accordance with embodiment that are described herein.

FIG. 3 is a diagram that schematically illustrates threshold voltage distributions (TVDs) of target memory cells and neighbor memory cells, as well as read configurations for crosstalk mitigation, in accordance with embodiments that are described herein.

The TVDs in FIG. 3 correspond to memory cells in a TLC device having eight programming levels denoted PL0 . . . PL7. Alternatively, other memory cells that store data in a number of programming levels other than eight can also be used. TVDs 72A and 72B correspond to the target WL and neighbor WL, respectively.

For the target WL (lower diagram), RV34 denotes a read voltage centered (or approximately centered) between the nominal programming levels PL3 and PL4. RV34 represents an optimal (or close to optimal) setting of reading using a single read voltage. The left side (Lrv) and right side (Rrv) read voltages of the soft sensing scheme are centered (or approximately centered) about RV34. Lrv and Rrv may be used for the soft sensing scheme as described above. Moreover, sampling at Rrv may be emulated by continuing the sensing time over a second sensing interval as described above.

As explained above, the neighbor word line WL (N+1) may be set to the full conducting voltage (e.g., VREAD) in a standard read configuration or to the partial conducting voltage (e.g., VREAD/2) in the modified read configuration. As shown in the example of FIG. 3, the value of the full conducting voltage is higher than the maximal threshold voltage expected, so as to ensure that the memory cells in WLs set to the full conducting voltage are in conductive states (which allows BL discharge). In this case, all memory cells for which Vt<Lrv (or Vt<Rrv) can fully discharge their BLs. When WL (N+1) is set to the partial conducting voltage, only memory cells for which Vt<Lrv (or Vt<Rrv) and whose neighbor memory cells have Vt below the partial conducting voltage are in the conductive states and therefore may discharge their BLs.

A Low Latency Reading Scheme that Mitigates Crosstalk

In some embodiments, R/W unit 36 performs a read operation by sampling the target WL three or more times to produce three or more respective readouts. The readouts are processed by combinational logic (e.g., 52 of FIG. 1A) to produce hard bits (54) and associated confidence levels (56). To take the threshold voltages of neighbor memory cells into consideration while reading the target WL, at least one of the readouts corresponds to setting the neighbor WL to the partial conducting voltage. In addition, to achieve a low latency read operation, the multiple readouts are all sampled in a sequence of sensing intervals following a single common pre-charge operation.

FIG. 4 is a flow chart that schematically illustrates a low latency reading scheme that mitigates crosstalk interference, in accordance with an embodiment that is described herein.

The method will be described as executed by R/W unit 36 of memory device 24. In describing the method, it is assumed that the neighbor WL can be set in a standard read configuration to a full conducting voltage, or in a modified read configuration to a partial conducting voltage lower than the full conducting voltage, as described above with reference to FIG. 3. Moreover, the target WL is sensed at read voltages Lrv and Rrv>Lrv (e.g., of the soft sense method), wherein the sensing at Rrv may be emulated, as described above.

The method begins with R/W unit 36 receiving a read command from memory controller 40, for reading a page from the target WL at a given read voltage RV. The page being read is assumed to have been stored encoded with a suitable error correction code.

At a target WL setting step 104, the R/W unit sets (e.g., pre-charges) the target WL to a read voltage Lrv that is lower than the given RV. Example relationships between the read voltage RV34, Lrv and Rrv are shown in FIG. 3 above.

At an additional WL setting step 108, the R/W unit sets (e.g., pre-charges) each of the other WLs in the column, including the neighbor WL, to the full conducting voltage or to the partial conducting voltage. As will be described below, in some embodiments, all the WLs other than both the target WL and the neighbor WL are set (e.g., pre-charged) to the full conducting voltage, whereas the neighbor WL is initially set (e.g., pre-charged) to the partial conducting voltage, and is later toggled to the full conducting voltage while the BLs being discharged. The toggling between the partial and full conducting voltages allows the discrimination between target memory cells whose neighbor memory cells have low and high threshold voltages, thereby improving decoding capabilities.

At a BL pre-charging step 112, the R/W unit pre-charges the BLs, and then allows the BLs to discharge by opening the drain gate selector transistor and the source gate selector transistor (e.g., 64 and 66 of FIGS. 2A and 2B). In an embodiment, the various WL pre-charging operations of steps 104 and 108, and the BL pre-charging of step 112 are carried out during a common pre-charge interval.

At a multi-read step 116, while discharging the BLs, the R/W unit reads the encoded page from a group of target memory cells that are coupled to the target WL, multiple times, to produce multiple respective binary readouts, wherein at least one of the binary readouts corresponds to setting the neighbor WL to the partial conducting voltage. In an embodiment, each of the binary readouts is produced by strobing the relevant BLs, as described above.

At an output generation step 120, the R/W unit applies combinational logic (52) to the multiple binary readouts to produce (i) output bits of the page, and (ii) binary confidence levels associated with the output bits.

At an output delivery step 124, the R/W unit transmits the output bits and the respective binary confidence levels to memory controller 40 over link 42. The memory controller uses both the output bits and the respective confidence levels for recovering a decoded version of the page using any suitable soft decoding method(s). As an example, in one embodiment the decoder may utilize the output bits and the binary confidence levels to assign different Log-Likelihood Ratio (LLR) values to bits belonging to distinct readout groups in order to increase the probability of successful decoding. This in turn can improve the error correction capability of the decoder compared to a decoder, which receives readouts that are grouped more coarsely. Following step 124 the method terminates.

In some embodiments, the R/W unit pre-charges the BLs again only in performing a subsequent read operation, e.g., upon receiving a subsequent read command from the memory controller.

The method of FIG. 4 mitigates crosstalk by controlling the setting of the neighbor WL to the full conducting voltage or to the partial conducting voltage. Moreover, the BLs are pre-charged only once for producing the multiple readouts, which results in a fast read operation.

FIG. 5 is a diagram that schematically illustrates steps in performing a read operation 100 using the method of FIG. 4, in accordance with an embodiment that is described herein.

Read operation 100 in FIG. 5 is carried out by R/W unit 36 over a pre-charge interval 102, followed by a BLs discharge interval 104 that is divided into four sensing intervals 110A . . . 110D denoted INTERVAL_1 . . . INTERVAL_4, respectively.

As will be described below, the R/W unit reads the target WL multiple times to produce multiple readouts, wherein each of the readouts corresponds to a different respective sensing interval. In some embodiments the sensing intervals are specified by respective predetermined delays relative to a time related to the pre-charge interval. In other embodiments the sensing intervals may be specified by starting and ending times per a sensing interval, or by starting times and corresponding durations per a sensing interval.

Below each sensing interval the following attributes are depicted: the voltage setting of the neighbor WL (130), the read voltage used for reading the target WL (132), a condition in the target WL and neighbor WL for BL discharge in that interval (134), the readout corresponding to the interval (136), the progressive calculation (138) for producing the hard bits Hb based on the readouts, and the progressive calculation (140) for producing the confidence levels Sb based on the readouts.

In the present example, the values of the full conducting voltage and the partial conducting voltage equal VREAD and VREAD/2, respectively. In alternative embodiments, however, other suitable full conducting voltage and/or partial conducting voltage values can also be used.

At the first sensing interval 110A (e.g., before or just as the first sensing interval begins), the R/W unit sets the neighbor WL to VREAD/2, and reads the target WL at the read voltage Lrv. Consequently, only BLs whose target memory cells have Vt<Lrv and whose neighbor cells have Vts below VREAD/2 are allowed to discharge their BLs. (In FIG. 5 (134), the symbol "Vt_N" denotes a Vt of a neighbor memory cell) and the symbols "&" denotes a logical AND operation. The readout associated with the first sensing interval is denoted "L_LOW" to indicate sensing at Lrv for target cells whose neighbor cells have low threshold voltages.

At the second sensing interval 110B, the neighbor WL remains set to VREAD/2, and the R/W unit reads the target WL at emulated Rrv, as described above. In this case, BLs whose target memory cells have Vt<Rrv and whose neighbor cells have Vts below VREDA/2 are allowed to discharge their BLs. The readout associated with the second interval is denoted "R_LOW" to indicate sensing at Rrv for target cells whose neighbor cells have low threshold voltages.

At the third sensing interval 110C, the R/W unit sets the neighbor WL to VREAD, and reads the target WL read at Lrv. In this case, all target memory cells for which Vt<Lrv and their neighbor memory cells have Vts above VREAD/2 can now discharge their BLs. The readout associated with the third sensing interval is denoted "L_HIGH" to indicate sensing at Lrv for target memory cells whose neighbor cells have high threshold voltages.

At the fourth sensing interval 110D, the neighbor WL remains set to VREAD, and the R/W unit reads the target WL at the emulated Rrv. In this case, all target memory cells have for which Vt<Rrv and their neighbor memory cells have Vts above VREAD/2 can now discharge their BLs. The readout associated with the fourth interval is denoted "R_HIGH" to indicate sensing at Rrv for target memory cells whose neighbor cells have high threshold voltages.

In FIG. 5, the calculations of Hb and Sb progress as relevant readouts become available. Hb is initialized to L_LOW (of the first interval) and is XORed with R_LOW (of the second interval) and further XORed with R_HIGH (of the fourth interval) to produce the final value of Hb. It is noted that in the calculations of FIG. 5, the symbol '+' denotes a logical bitwise XOR operation. Sb is initialized by XORing between the intermediate value of Hb of the second interval and L_HIGH of the third interval. The intermediate value of Sb of the third interval is further XORed with R_HIGH of the fourth interval to produce the final value of Sb.

In some embodiments, during the discharge period, readout and intermediate/final calculation results are latched into one or more latches of the R/W unit. The maximal numbers of latches required for the calculations of Hb and Sb in the sensing intervals 110A . . . 110D are given by 1, 2, 3, 3, respectively. The numbers of latches required for holding intermediate and final results of Hb and Sb in the sensing intervals s 110A . . . 110D are given by 1, 1, 2, 2, respectively.

It can be shown that by performing the multi-interval sensing scheme and calculations of FIG. 5, the resulting Hb and Sb are mapped in various regions of the Vt as given in Table 1.

15                                                    16

TABLE 1

| | | hard bits and soft bits mapping in various Vt regions | | |
|---|---|---|---|---|
| Neighbor level | Hard/ Soft bit | Vt < Lrv | Lrv < Vt < Rrv | Vt > Rrv |
| Low | Hb | 1 | 0 | 0 |
| | Sb | 0 | 1 | 0 |
| High | Hb | 1 | 1 | 0 |
| | Sb | 0 | 1 | 0 |

As shown in Table 1, within the high confidence regions Vt<Lrv and Vt>Rrv, the binary confidence level is given by Sb=0, and within the low confidence region Lrv<Vt<Rrv, Sb=1. Moreover, in the high confidence regions (below Lrv and above Rrv) the hard decision bit is determined independently of the neighbor cell level. In the low confidence region between Lrv and Rrv, however, Hb=0 when the neighbor level is low, and Hb=1 when the neighbor level is high, therefore discriminating between target memory cells in the low confidence region whose neighbor cells have respective low and high threshold voltages.

When the neighbor cell has a low Vt (e.g., below VREAD/2), the Vt of the target memory cell typically increased slightly, and is therefore more likely to have been programmed to '0'. On the other hand, when the neighbor cell has a high Vt (e.g., above VREAD/2), the Vt of the target memory cell typically increases significantly, and is therefore more likely to have been programmed to '1'. Consequently, the bit mapping in Table 1, in which the hard bits are determined depending on neighbor cells information, results in better decoding capabilities compared to a conventional reading scheme that ignores the neighbor memory cells. Moreover, the disclosed reading schemes are based on a single pre-charge operation followed by a sequence of sensing intervals (without applying another pre-charge operation), resulting in a read operation whose latency is much shorter than can be achieved by reading schemes that employ multiple pre-charge operations per read operation.

The embodiments described above are given by way of example, and other suitable embodiments can also be used. For example, although the embodiments described above refer mainly to crosstalk mitigation implemented in the memory device, in other suitable embodiments, the disclosed embodiments may be implemented in hardware in the memory controller or divided between the memory device and memory controller.

The reading schemes described above refer mainly to sampling the target WL four times within the same read operation to produce four readouts to which combinational logic is applied. This, however, is not mandatory, and in alternative embodiments sampling from the target WL a number of readouts larger than four (within the same read operation at a given RV) can also be used.

In the example embodiments described above, a single read operation was described for the sake of simplicity. For multi-level cells, however, one or multiple read operations (at multiple different RVs) are needed per page of each bit significance, e.g., numbers of RVs 1, 2, 4, or 2, 3, 2 for a least significant bit (LSB) page, a most significance bit (MSB) page, and an upper significance bit (USB) page, in a TLC device. The disclosed embodiments are applicable, however, with suitable modifications, to all read operations that require reading the WL at multiple RVs.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A storage system, comprising:
a plurality of memory cells coupled to multiple WLs and to multiple BLs; and
circuitry comprising combinational logic implemented in hardware, the circuitry configured to:
set a first read voltage to a target WL among the multiple WLs, and set each of the WLs other than the target WL, including a neighbor WL neighboring to the target WL, to a predefined full conducting voltage or to a predefined partial conducting voltage lower than the full conducting voltage;
pre-charge the multiple BLs;
while discharging the pre-charged BLs, read a page from a group of target memory cells that are coupled to the target WL, multiple times, to produce multiple respective binary readouts, wherein at least one of the binary readouts corresponds to setting the neighbor WL to the partial conducting voltage;
apply the combinational logic to the binary readouts to produce (i) output bits of the page, and (ii) respective binary confidence levels associated with the output bits; and
transmit the output bits and the binary confidence levels to a controller.

2. The storage system according to claim 1, wherein the circuitry is configured to read the target WL multiple times at respective predetermined delays relative to a time of the pre-charge, to produce the multiple binary readouts.

3. The storage system according to claim 1, wherein the circuitry is configured to pre-charge the BLs again only in performing a subsequent read operation from the memory cells.

4. The storage system according to claim 1, wherein the circuitry is configured to read the target WL in a sequence of time intervals.

5. The storage system according to claim 4, wherein for reading the target WL in a first time interval and in a second time interval among the time intervals, the circuitry is configured to set the neighbor WL to the partial conducting voltage.

6. The storage system according to claim 5, wherein for reading the target WL in a third time interval and in a fourth time interval that follow the first and the second time intervals, the circuitry is configured to set the neighbor WL to the full conducting voltage.

7. The storage system according to claim 6, wherein during the second and the fourth time intervals, the circuitry is configured to read the target WL while emulating the reading of the target WL at a second read voltage higher than the first read voltage.

8. The storage system according to claim 1, wherein the circuitry resides in a memory device comprising the memory cells.

9. The storage system according to claim 1, wherein the page was stored encoded using an error correction code, and wherein the circuitry is configured to transmit the output bits and the confidence levels to the controller for recovering a decoded version of the page by applying by the controller soft decoding to both the output bits and the confidence levels.

10. A method for data storage, comprising:

in a storage system comprising circuitry and a plurality of memory cells coupled to multiple WLs and to multiple BLS, setting, by the circuitry, a first read voltage to a target WL among the multiple WLs, and setting each of the WLs other than the target WL, including a neighbor WL neighboring to the target WL, to a predefined full conducting voltage or to a predefined partial conducting voltage lower than the full conducting voltage;

pre-charging the multiple BLs;

while discharging the pre-charged BLs, reading a page from a group of target memory cells that are coupled to the target WL, multiple times, to produce multiple respective binary readouts, wherein at least one of the binary readouts corresponds to setting the neighbor WL to the partial conducting voltage;

applying combinational logic of the circuitry implemented in hardware, to the binary readouts, to produce (i) output bits of the page, and (ii) respective binary confidence levels associated with the output bits; and transmitting the output bits and the binary confidence levels to a controller.

11. The method according to claim 10, wherein reading the target WL comprises reading the target WL multiple times at respective predetermined delays relative to a time of the pre-charge, to produce the multiple binary readouts.

12. The method according to claim 10, and comprising pre-charging the BLs again only in performing a subsequent read operation from the memory cells.

13. The method according to claim 10, wherein reading the target WL comprises reading the target WL in a sequence of time intervals.

14. The method according to claim 13, and comprising reading the target WL in a first time interval and in a second time interval among the time intervals, by setting the neighbor WL to the partial conducting voltage.

15. The method according to claim 14, and comprising reading the target WL in a third time interval and in a fourth time interval that follow the first and the second time intervals, by setting the neighbor WL to the full conducting voltage.

16. The method according to claim 15, wherein during the second and the fourth time intervals, reading the target WL comprises reading the target WL while emulating the reading of the target WL at a second read voltage higher than the first read voltage.

17. The method according to claim 10, wherein the circuitry resides in a memory device comprising the memory cells.

18. The method according to claim 10, wherein the page was stored encoded using an error correction code, and wherein transmitting the output bits and the confidence levels comprises transmitting the output bits and the confidence levels to the controller for recovering a decoded version of the page by applying by the decoder soft decoding to both the output bits and the confidence levels.

* * * * *